US012628830B2

(12) United States Patent (10) Patent No.: US 12,628,830 B2
Guerrieri et al. (45) Date of Patent: May 19, 2026

(54) COMPOSITION FOR THE TREATMENT AND PREVENTION OF THE ESCA DISEASE

(71) Applicant: ESCAFIX S.R.L., Montalcino (IT)

(72) Inventors: Mario Guerrieri, Montalcino (IT);
Roberto Ercolani, Montalcino (IT)

(73) Assignee: ESCAFIX S.R.L., Montalcino (IT)

( * ) Notice: Subject to any disclaimer, the term of this
patent is extended or adjusted under 35
U.S.C. 154(b) by 0 days.

(21) Appl. No.: 18/681,293

(22) PCT Filed: Aug. 11, 2022

(86) PCT No.: PCT/EP2022/072529
§ 371 (c)(1),
(2) Date: Feb. 5, 2024

(87) PCT Pub. No.: WO2023/017112
PCT Pub. Date: Feb. 16, 2023

(65) Prior Publication Data
US 2024/0260585 A1 Aug. 8, 2024

(30) Foreign Application Priority Data

Aug. 13, 2021 (IT) ........................ 102021000021884

(51) Int. Cl.
| *A01N 63/38* | (2020.01) |
| *A01N 59/06* | (2006.01) |
| *A01N 63/22* | (2020.01) |
| *A01N 63/27* | (2020.01) |
| *A01N 63/28* | (2020.01) |
| *A01N 65/03* | (2009.01) |
| *A01P 3/00* | (2006.01) |

(52) U.S. Cl.
CPC ............. *A01N 63/38* (2020.01); *A01N 59/06*
(2013.01); *A01N 63/22* (2020.01); *A01N*
*63/27* (2020.01); *A01N 63/28* (2020.01);
*A01N 65/03* (2013.01); *A01P 3/00* (2021.08)

(58) Field of Classification Search
CPC ........ A01N 63/38; A01N 63/27; A01N 63/28;
A01N 63/22; A01N 59/06; A01N 65/03;
A01P 3/00
See application file for complete search history.

(56) References Cited

FOREIGN PATENT DOCUMENTS

| EP | 1990404 A1 | 3/2014 |
| EP | 2915426 A1 | 9/2015 |

OTHER PUBLICATIONS

"Biowave 1000", Jan. 2, 2021, retrieved from the internet URL http://isla.bio/download/5170/ on Mar. 9, 2022.
"Challenger EVO Q", Jan. 2, 2021, retrieved from the internet URL https://isla.bio/download/5174/ on Mar. 9, 2022.
"Esquive WP", Dec. 2, 2020, pp. 102, Italy, retrieved from the Internet URL: https://sb4.sumitomo-chem.it1025/api/Dowload/DownloadFile?filed=11429 Oct. 24, 2022.
"Jocker Bio 343 EVO Q", Jan. 2, 2021, retrieved from the internet URL https://isla.bio/download/5170/ on Mar. 9, 2022.
"Micosat F", Catalogo 2021, Jul. 1, 2020, pp. 1-84, retrieved from the Internet URL: https://www.micosat.it/wp-content/uploads/2020/07/Catalogo-MICOSAT Oct. 24, 2022.
"Sylicron F5 EVO Q", Jan. 2, 2021, retrieved from the Internet URL: http://isla.bio/download/5299, on Mar. 9, 2022.
Di Marco S et al., "Effect of biostimulant sprays on Phaeomoniella chlamydospora and esca proper infected vines under greenhouse and field conditions", Apr. 1, 2007, retrieved from the Internet URL http://www.fupress.net/index.php/pm/article/viewFile/2874/2556# on Aug. 4, 2014.
Pertot I et al., "Trichoderma atroviride SC1 prevents Phaemoniella chlamydospora and Phaeacremonium aleophilum infection of grapevine plants during the grafting process in nurseries", BioControl (2016) 61:257-267.
Search Report and Written Opinion of PCT/EP2022/072529 dated Nov. 3, 2022.
International Preliminary Report on Patentability for PCT/EP2022/072529 issued Mar. 27, 2023.

*Primary Examiner* — Louise W Humphrey
*Assistant Examiner* — Rachel Emily Martin
(74) *Attorney, Agent, or Firm* — Silvia Salvadori, P.C.;
Silvia Salvadori

(57) ABSTRACT

A composition for the treatment of the esca disease is herein described, which can be produced in the form of a paste or a liquid and can be applied on the stem of the plant to treat the disease and/or sprayed on the aerial part, on the stem or on the fertilizer to prevent infection of the plant with pathogenic fungi.

11 Claims, No Drawings

1

COMPOSITION FOR THE TREATMENT AND PREVENTION OF THE ESCA DISEASE

This application is a U.S. national stage of PCT/EP2022/072529 filed on 11 Aug. 2022, which claims priority to and the benefit of Italian Application No. 102021000021884 filed on 13 Aug. 2021 the contents of which are all incorporated herein by reference in their entireties.

FIELD OF THE INVENTION

The present invention relates to a composition for the treatment of the esca disease, which is a disease of the grapevine caused by a group of fungi that colonize the lymphatic vessels and the wood, jeopardizing the transport of water and nutrients from the roots to the aerial part of the plant. The composition of the invention can be produced in the form of a paste or solution and can be applied on the stem of the plant to treat the disease and/or sprayed on the aerial part, on the stem or on the fertilizer to prevent infection of the plant by pathogenic fungi.

BACKGROUND OF THE INVENTION

The esca disease is widespread in all wine-growing areas of the world and currently causes serious damage even in young plants. The complexity of this disease is mainly linked to the fact that there is currently no product capable of blocking it. In the past sodium arsenite was used, but it was withdrawn from the market due to its toxicity to humans and the environment. In fact, the use of this substance was banned in 2003.

Between 2003 and 2007, in Spain, the number of vineyards affected increased from 1.8% to 10.5%. Epidemiological studies conducted in Tuscany, Marche, Abruzzo, Puglia and Sicily have shown that the incidence of the esca disease has reached 60-80% in the oldest vineyards and France estimates that, due to this phytopathy, 11% of the nation's total number of grapevines are not productive (*Mal dell'esca: storia e impatto economico*, 25 Mar. 2019, www.freshplaza.it).

The more important economic menaces for the viticulture have been identified in water stress and esca disease [Fischer M., Peighami Ashnaei S. (2019), *Grapevine, esca complex, and environment: the disease triangle*, Phytopathologia Mediterranea 58(1): 17-37].

There are studies relating to the economic benefit deriving from the application of fungicide treatments after pruning to counteract diseases of the grapevine stem. In particular, in the article *Long-Term Benefits of Protecting Table Grape Vineyards against Trunk Diseases in the California Desert* (Agronomy, 2020, 10, 1895; Gispert C., Kaplan J. D., Deyett E., Rolshausen P. E.) reports of a newly planted table grape vineyard in the California desert, which was divided into two blocks treated in a different way: in one block, methyl thiophanate fungicide was applied to pruning wounds for six consecutive years, while the other remained untreated. The results have shown a significantly lower incidence of trunk diseases and replanting of grapevines in treated blocks, together with a significant increase in total and marketable fruit. The annual economic benefits of applying fungicide to pruning wounds appear to range from $8,500 to $12,500 per hectare per year in a 50-75% disease control scenario.

The following Table A [from Bigot G, Freccero A., Montermini A, Bortolotti P., Nannini R, Impiego di *Trichoderma* contro il mal dell'esca della vite, L'Informatore Agrario, VI (6), 2015] reports the economic impact of the esca disease in Euros per hectare in 5 different wine production areas in Italy: classic Chianti area (Castelnuovo Berardenga, Siena), noble Chianti area (Montepulciano, Siena), Valpolicella area (Cazzano di Tramigna, Verona), Lambrusco Salamino area (Novellara, Reggio Emilia) and Friuli Colli Orientali area (Udine). In this study, the treatment to which the vineyards were subjected was the use of *Trichoderma*.

TABLE A

| Economic impact of the esca disease (euro/ha) | | | | | | |
|---|---|---|---|---|---|---|
| | Castelnuovo Berardenga (SI) | Montepulciano (SI) | Cazzano di Tramigna (VR) | Novellara (RE) | Prepotto (UD) | Cividale del Friuli (UD) |
| Treated | | | | | | |
| Lack of production from dead plants | 2,644 | 178 | 1,547 | 233 | 1,495 | 4,554 |
| Lack of production from plants with symptoms | 1,333 | 670 | 2,765 | 3,630 | 244 | 769 |
| Replanting management | 4,345 | 419 | 1,836 | 1,020 | 3,000 | 7,037 |
| Treatment cost | 360 | 360 | 360 | 450 | 360 | 450 |
| Total | 8,682 | 1,627 | 6,508 | 5,333 | 5,099 | 12,810 |
| Not treated | | | | | | |
| Lack of production from dead plants | 4,141 | 205 | 2,602 | 644 | 1,902 | 4,944 |
| Lack of production from plants with symptoms | 2,246 | 1,308 | 3,880 | 4,909 | 394 | 1,605 |
| Replanting management | 7,973 | 737 | 3,902 | 2,820 | 4,152 | 8,238 |
| Total | 14,360 | 2,250 | 10,384 | 8,373 | 6,448 | 14,787 |
| Economic loss deriving from the lack of treatment (euro/ha) | 5,678 | 623 | 3,866 | 3,040 | 1,349 | 1,977 |

The pruning wounds of the plant represent the preferential route of a new infection.

It has been recently put in the market a product called "Remedier" (from the 2014 catalogue, Gowan Italy), which is described to preventively defend against this pathology.

This biofungicide formulated as a powder is made of a mixture of two strains of *Trichoderma asperellum* and *gamsii*. It acts by competition at the level of the infection sites against pathogenic fungi, from which the vital space and the nutrients necessary to trigger the infectious process are subtracted. Moreover, it forms a protective barrier, which prevents the penetration of pathogenic fungi through openings or wounds.

This product is therefore preventively applied on the plant; it does not have curative effects, but prevents the spread of the disease, with a general lowering of the symptoms in the vineyards. This beneficial effect is increasingly noticeable, if the treatment is repeated over the years.

The optimum period to make the treatment with Remedier on the grapevine is comprised between March and April, in the "weeping" phase (the sap that comes out of the pruning cuts favors the colonization by the *Trichoderma*).

The use of substituted or unsubstituted hydroxyapatite functionalized with at least one bioactive molecule for the prevention and treatment of diseases of the grapevine stem, in particular of the esca disease is claimed in the document WO15075645 A1.

The patent document EP2915426 B1 claims composition, use and method for reducing the symptoms on the epigeal apparatus associated with the esca disease of the grapevine, comprising a treatment phase of plants of the genus *Vitis* with a composition containing an extract of algae of the Fucaceae family, $CaCl_2$ and $Mg(NO_3)_2$ in appropriate percentages.

The above-mentioned product solves the problem on the apexes of the grapevine, alleviating the symptoms of esca disease, while there remains the need for a product that acts at a meristematic level, both on the apexes and on the woody parts of the grapevine, stabilizing the disease and safeguarding future productions over time.

However, to date no cure capable to heal plants already diseased exists. To date, the only remedy that a winegrower has to stem the economic losses due to the spread of the disease is to remove dead plants and replace them with young plants, which, obviously, will not be productive for a certain number of years.

DESCRIPTION OF THE INVENTION

The applicant has now surprisingly found a composition, which is capable not only to prevent the infection, but also to cure the diseased plants, in such an effective way as to become productive again already during the harvesting period following treatment.

The composition of the invention comprises:

1) a mixture of minerals comprising clinoptilolite, at least one further zeolite and fullerite;
2) a microbial mixture comprising fungi of the genus *Trichoderma*, in particular *Trichoderma atroviride*, and bacteria of the genus *Pseudomonas*, in particular *Pseudomonas fluorescens, Bacillus*, in particular *Bacillus subtilis*, and *Streptomyces*, in particular *Streptomyces griseous;*
3) a product obtained from the fermentation of soy with *Bacillus subtilis*, comprising poly-glutamic acid;
4) a mixture of brown algae including *Ascophyllum nodosum* algae;

5) an organic fertilizer of vegetable origin deriving from the hydrolysis of corn germ, including free amino acids;
6) pre-fermented molasses with the mixture referred to in point (2), comprising poly-glutamic acid and poly-hydroxy butyrate; and
7) an aqueous fullerite suspension.

Clinoptilolite is a hydrated alkaline aluminosilicate, one of the most abundant minerals of the zeolite family. It consists of an external structure of silica and alumina tetrahedra, inside which water molecules and exchangeable cations (for example calcium, potassium, sodium) migrate freely. Although the chemical formula of clinoptilolite varies with the composition, a typical representation is given by $(Na_2K_2,Ca)_3Al_6Si_{30}O72 \cdot 24H_2O$ (definition from the Encyclopaedia Britannica—https://www.britannica.com/science/clinoptilolite).

The term zeolitite was introduced in 2011 (Galli E., Passaglia E., 2011; Natural zeolites in environmental engineering. In: H. Holzapfel ed., Verlag ProcessEng Engineering GmbH, Zeolites in Chemical Engineering, 392-416) to define the diagenized pyroclastic rocks with a prevalent (>50%) content in zeolite and lower quantities of other silicate phases (quartz, cristobalite, feldspar, plagioclase, pyroxene, mica) and volcanic glass.

Fullerites, along with graphite and diamond, represent a third form of crystalline carbon. They are molecular crystals made up of fullerenes, i.e. carbon molecules with closed-cage structures (Wolfgang Kratschmer, Fullerenes and fullerites: new forms of carbon, Nanostructured Materials, Vol. 6, Issue 1-4, 1995, pp. 65-72).

These minerals can be purchased from various commercial sources. In Italy, for example, a supplier and importer company is A. Q. EVO S.R.L.

The microbial mixture and the other components of the composition of the present invention can for example be purchased from the company Isla S.r.l.

The composition of the present invention can be in the form of a paste, in the form of a liquid or even as a component of an organic soil conditioner in the form of a solid, pellet or granulate to be introduced into the soil. In the first case it is suitable for use for the healing of sick plants, through the application on a longitudinal section of the stem; in the second case it is suitable for the prevention of the disease on healthy plants, through the dispersion (spray) on the aerial part or on the stem of the plant or in the soil conditioner to prevent infection of the plant by pathogenic fungi, which cause the esca disease by colonizing the cultivation soil in advance.

According to an aspect of the invention, component 1 is present in quantities ranging from 30% to 75% by weight; component 2 is present in quantities ranging from 3% to 7% by weight; component 3 is present in quantities ranging from 6% to 10% by weight; component 4 is present in quantities ranging from 1% to 5% by weight; component 5 is present in quantities ranging from 40 to 50% by weight; component 6 is present in quantities ranging from 1% to 5% by weight; and component 7 (the aqueous suspension of fullerite) contains from 3 to 6% by weight of fullerite and the water is present in sufficient quantity to reach the desired consistency, for example, if you want a paste, you will need a quantity from 5% to 7% by weight of water.

The application of the composition of the invention on the grapevines affected by esca disease is carried out in the following way. The stem of the diseased plant is cut lengthwise into two sections. Subsequently, the composition of the invention, preferably in the form of a fluid paste, is spread on the two surfaces of each corresponding section inside the stem.

Therefore, the present invention also comprises a method for the treatment of grapevines suffering from the esca disease comprising:

1) making a longitudinal cut of the stem in order to obtain two sections;

2) uniformly applying the composition of the present invention on the two surfaces of each corresponding section inside the stem.

The present invention also includes a method for the prevention of the esca disease of the grapevines, comprising the dispersion on the aerial parts of the grapevines and/or on the ground the composition of the invention.

Unless otherwise defined, all technical and scientific terms used here and below have the same meaning as commonly understood by a person with ordinary experience in the art, to which the present invention belongs.

Although methods and materials similar or equivalent to those described herein can be used in the practice and tests of the present invention, the methods and materials are described below as an example. The materials, the method and the examples have a merely illustrative purpose and must not be intended in a limiting way.

As used in this description and in the claims, the terms "comprising", "containing" or "including" means that at least the compound, element, material, excipient, or method or step, etc., indicated is present in the composition, formulation, or process, but the presence of other compounds, elements, materials, excipients or phases of the method, etc., is not excluded, even if the other such compounds, elements, materials, excipients, or method, or phases, etc., have the same function as that which is indicated, unless there is an explicit exclusion in the claims. It is also to be understood that the mention of one or more steps of the method does not exclude the presence of further steps of the method before or after the recited combined procedure or intermediate steps of the method among those expressly identified.

EXAMPLES

Example 1—Preparing the Composition According to the Invention

Materials

Mixture of minerals Silicron Evo Q.F5™ (Isla S.r.l.), containing 90% of natural zeolitites, with a prevalence of clinoptilolite, and 5% of fullerite, with a minimum purity of 30% in fullerenic carbon, in particles not exceeding 17 m of diameter Challenger Evo Q™ microbial blend (Isla S.r.l.) containing mycorrhizal fungi and rhizosphere bacteria, having in particular a mycorrhizal content (*Glomus* spp.) of 1%, a rhizosphere bacteria content of $1 \times 10^8$ CFU/g, such as *Pseudomonas, Streptomyces* and various types of *Bacillus* (such as *megaterium, amyloliquefaciens, lichefornis, subtilis*), a *Trichoderma* content (such as *Trichoderma atroviride*) of $1 \times 10^8$ CFU/g Product obtained from the fermentation of soy together with 5% of sugar cane or sugar beet molasses with the previous microbial mixture, containing poly-glutamic acid and Biowave 1000™ poly-hydroxy butyrate (Isla S.r.l.)

Super Energy Stim™ seaweed cream (Isla S.r.l.) containing brown algae, in particular *Ascofillum nodosum* at 30%, with the presence of alginates and other polysaccharides Organic fertilizer of vegetable origin deriving from the hydrolysis of corn germ, containing free amino acids JOCKER BIO 343 EVO Q™ (Isla S.r.l.)

Aqueous suspension of fullerite

Method

In an open rotating mixer the liquid compounds were introduced first in the following order: JOCKER BIO 343 EVO Q™ (30 kg), Biowave 1000™ (4 kg) and then Silicron Evo Q.F5™ (25 kg) was introduced and it was left to mix for 20 minutes. Subsequently in the following order Super Energy Stim™ (3 Kg) and Biowave 1000™ (4 Kg) were added. It was left to mix for at least 30 minutes and then Silicron Evo Q.F5™ (20 Kg), Challenger Evo Q™ (5 Kg) were added. It was mixed for another 30 minutes and then Silicron Evo Q.F5™ (7 Kg) and the aqueous suspension of fullerite (2 Kg), having 30% by weight of fullerenic carbon, were added, mixing for at least 60 minutes. At the end of said mixing, the resulting composition was immediately packaged in 5 kg buckets.

Example 2—Treatment of the Esca Disease with the Composition According to the Invention The experiment was aimed at verifying the curative potential of the composition of the invention prepared in Example 1 (hereinafter referred to as "Zeofix") in the treatment of grapevines, which presented the symptoms of the esca disease. In order to obtain valid results from a scientific point of view, an experimental scheme has been implemented capable of evaluating:

1) the healing of grapevines affected by the esca disease, following the experimental treatment;

2) the production capacity of the treated grapevines;

3) the production of grapes from a qualitative point of view.

The research was carried out in two marked vineyards (Vineyard 1 and Vineyard 2) and in both lots the number of samples analyzed is adequate for the purposes of a subsequent statistical analysis.

Results of the Growing Season 2020

For each vineyard in the 2020 season a block diagram was implemented with 3 repetitions and comparing the following groups:

TREATED 2018: Plants treated with "Zeofix" against esca disease in the year 2018;

TREATED 2019: Plants treated with "Zeofix" against esca disease in the year 2019;

HEALTHY 2018—Plants not treated with "Zeofix", marked as healthy 2018; and

HEALTHY 2019—Plants not treated with "Zeofix", marked as healthy 2019.

Each repetition consisted of at least 10 plants appropriately identified within the vineyard. In addition to the plants making up the scheme highlighted above, a greater number of symptomatic grapevines treated with Zeofix were monitored, in order to obtain data on a large number of individuals.

The application of the composition of the invention on the grapevines affected by esca disease was carried out in the following way. The stem of the diseased plant was cut lengthwise into two sections.

Subsequently, the composition of the invention in the form of a fluid paste was spread on the two surfaces of each corresponding section inside the stem.

Vineyards Under Observation

Vineyard 1: Sangiovese cultivation, hilly position, counter-espalier training system with spurred cordon pruning;

Vineyard 2: Sangiovese cultivation, flat lay, training system: counter-espalier, pruning: spurred cordon.

Physiological Surveys Carried Out on Plants:

Measurement of leaf gas exchanges—Instrument used: IRGA-CIRAS-3 (PP System Inc., USA).

Measured parameters: Net photosynthesis, transpiration, stomatal conductance, $CO_2$ concentration in the substomatic cavity, leaf temperature, vapor pressure deficit between leaf and air, efficiency in the use of water for photosynthesis. In detail, the parameters detected by the instrument are the following:

Net photosynthesis (unit of measurement: mol $CO_2$ m$^{-2}$ s$^{-1}$)—The net photosynthesis is detected through the absorption rate of carbon dioxide by the leaf, by analyzing the difference in $CO_2$ concentration between the air introduced and that which comes out of the measuring chamber. This difference is measured by an infrared gas analyzer (IRGA), which exploits the property of $CO_2$ to absorb in the infrared.

Transpiration (unit of measurement: mmol $H_2O$ m$^{-2}$ s$^{-1}$)—Transpiration is detected by analyzing the partial pressure difference of the water vapor entering and leaving the measurement chamber. In addition, in this case the IRGA tool exploits the property of water to absorb in the infrared.

Stomatal conductance (unit of measurement: mmol $H_2O$ m$^{-2}$ s$^{-1}$)—It can be defined as the inverse of the resistance offered by the stomata to the diffusion of $H_2O$ and $CO_2$ in the directions of the respective concentration gradients ($H_2O$ towards the outside, $CO_2$ towards the interior). Plants can regulate it by changing the opening of the stomatal rims.

WUE—efficiency in the use of water for photosynthesis—This parameter is obtained from the relationship between the rates of photosynthesis and transpiration.

Fluorimetric surveys—Instrument used: Handy PEA Fluorimeter (Hansatech Instruments, UK).

Measured parameters: $F_V/F_M$, for estimating the efficiency of Photosystem II; PI (Photosystem II Performance Index).

The instrument allows to measure the vitality of plants by measuring the direct fluorescence of chlorophyll through the exposure of the leaf sample to a saturating light, after a period of adaptation to the dark obtained with the use of leaf clips. A fluorescence detector, through a microprocessor, allows a precise and rapid measurement. In this way, it is possible to obtain the fluorescence intensity values from a basal level ($F_0$) to a maximum level ($F_M$).

Parameter $F_0$ indicates the loss of energy during the transfer between the antenna and the reaction center of photosystem II (PSII). High values of $F_0$ indicate a loss of efficiency in energy transfer, thus indicating structural damage to the photosystem itself. Conversely, low values indicate good functionality. Another important parameter is related to the maximum fluorescence ($F_M$), the decrease of which is an index of stress.

The ratio between the two extremes ($F_M/F_0$) is a further parameter used in physiology: in healthy leaves it has a value ranging between 4 and 5, but various stress factors (which involve an increase in $F_0$ and/or a decrease of $F_M$) can significantly reduce this value.

The $F_V/F_M$ ratio (where $F_V=F_M-F_0$, where $F_V$ indicates the variable fluorescence) indicates the maximum efficiency for primary photochemistry by the PSII and is the most used parameter as a reliable indicator of the photosynthetic apparatus. Theoretically, the $F_V/F_M$ ratio can vary from 0 to 1, but the optimal value of this parameter is 0.83. The decrease in this value, which occurs as a result of the action of various stress factors, indicates damage or reduced efficiency of the PSII reaction center.

Surveys with thermal imaging camera—Instrument used: FLIR T540 (FLIR System, USA).

Measured parameters: branch temperature, canopy temperature, water stress index (CWSI-Crop Water Stress Index). The measurements were carried out on 24 June and 27 Jul. 2020 in Vineyard 1 and on 6 and 27 Jul. 2020 in Vineyard 2, with the aim of evaluating the vegetative-productive efficiency of various types of symptomatic/asymptomatic plants and with or without treatment against the esca disease. The processing of the various data obtained became available in spring 2021.

Productive and Qualitative Surveys on Grapes at Harvest

In 2020 the surveys were carried out at the vineyard 1 on grapevines treated in previous years and on healthy (asymptomatic) grapevines. The parameters on the groups reported in the following Table 1 were detected: production per plant, number of bunches, average weight of bunches and berries, weight of pruning wood and calculation of the Ravaz index (ratio between the weight of the grapes and the weight of the wood produced in the year).

The technological analyses on the wort concerned the parameters shown in the following Table 2: sugars (° Brix), titratable acidity (g/L tartaric acid), pH, content in organic acids by IPLC (100 Series Agilent, USA).

TABLE 1

| | | | | | | |
|---|---|---|---|---|---|---|
| | | | Average | Average | Pruning | |
| | Production | Bunches | weight of | grape | wood | |
| | per plant | per plant | the bunch | weight | weight | Ravaz |
| Group | Kg | n. | g | g | g | Index |
| Treated | 0.60 | 3.40 | 138 | 1.32 | 277 | 2.17 |
| Healthy | 1.68 | 5.96 | 247 | 1.42 | 252 | 6.67 |

The plants treated showed an excellent vegetative recovery, albeit with less grape production due generally to the productive cordon being renewed and with fewer productive spurs. The chemical analysis have also highlighted a higher sugar content in the treated grapevines (+1,3° Brix on average) with respect to the healthy plants, as shown in the following Table 2.

TABLE 2

Analysis of the wort at harvest

| Group | ° Brix sugars | Total acidity g/L tartaric acid | pH |
|---|---|---|---|
| Treated | 25.8 | 4.81 | 3.50 |
| Healthy | 24.5 | 4.70 | 3.47 |

Grape samples were also taken to be subjected to analyses relating to phenolic maturity, in order to determine the following parameters: phenolic maturity [using the Glories method, Glories, Y. 1984, *La couler des vins rouges*, Connaisance Vigne Vin, 18(4), p. 253-271]; content of phenolic compounds with HPLC (100 Series, Agilent, USA), using the method of Gómez-Alonso (in Journal of Food Composition and Analysis, Vol. 20, Issue 7, November 2007, p. 618-626). The values relating to phenolic maturity indicate substantial homogeneity between healthy plants and plants recovered after treatment with Zeofix (Table 3).

TABLE 3

| | | Phenolic grape maturity in treated and healthy plants. | | | |
|---|---|---|---|---|---|
| Group | Total anthocyanins mg/kg | Extractable anthocyanins mg/kg | Technological phenolic richness DO 280 nm | Extractability % | Ripening of the grape seeds % |
| Treated | 989 | 701 | 77 | 28 | 63 |
| Healthy | 981 | 715 | 74 | 26 | 61 |

Further inspections in the vineyard were carried out during the months of July and September for the evaluation and mapping of the general health status of the plants, using the following classification:

Symptomatic plants with esca disease not yet treated,

Currently healthy plants with 2018/2019 treatment,

Plants with 2018/2019 treatment currently symptomatic,

Dead plants with treatment,

Dead plants without treatment.

The data collected following these findings are shown in the following Table 4.

TABLE 4

| Monitoring on new plants in the summer of 2020 | | |
|---|---|---|
| Condition of the grapevines | Vineyard 1 | Vineyard 2 |
| Plants with symptoms | 85 | 223 |
| Healthy plants with 2018/19 treatment | 201 | 156 |
| Symptomatic plants with 2018/19 treatment | 28 | 36 |
| Dead plants with 2018/19 treatment | 10 | 4 |
| Dead plants without treatment | 8 | 0 |
| Plants with mycoplasma symptoms | 0 | 86 |
| Plants with 2018/19 treatment with mycoplasma symptoms | 0 | 6 |
| Healthy plants | 1,982 | 2,555 |
| Total grapevines examined and mapped | 2,314 | 3,066 |

From the data of Table 4, in addition to the high presence of grapevines affected by the esca disease, it emerges that a considerable number of treated plants, equal to 8200, do not show visual symptoms of the disease. As regards the photosynthetic efficiency, no significant statistical differences (ANOVA) were highlighted in the measurements made with a fluorometer on healthy (asymptomatic) and treated plants, as shown in Table 5. Neither was the analysis of gas exchanges, carried out on the two dates of the July, showed statistically significant differences between healthy (asymptomatic) and treated vines (Table 6).

TABLE 5

| Parameters of the fluorometer measured in vineyards 1 and 2 | | |
|---|---|---|
| Parameter | TREATED | HEALTHY |
| | Vineyard 1 | |
| $F_V/F_M$ Ratio | 0.79 | 0.77 |
| Performance Index (PI) | 5.94 | 5.67 |
| | Vineyard 2 | |
| $F_V/F_M$ Ratio | 0.80 | 0.79 |
| Performance Index (PI) | 6.18 | 5.40 |

TABLE 6

| Average parameters relating to photosynthesis and gaseous exchanges of the leaves, measured in Vineyards 1 and 2 | | |
|---|---|---|
| Parameter | TREATED | HEALTHY |
| | Vineyard 1 | |
| Net photosynthesis $\mu mol\ CO_2\ m^{-2}\ s^{-1}$ | 8.49 | 9.29 |
| Transpiration mmol $H_2O\ m^{-2}\ s^{-1}$ | 4.89 | 4.73 |
| Stomatal conductance mmol $H_2O\ m^{-2}\ s^{-1}$ | 123 | 131 |
| Efficiency of water use (WUE) | 1.65 | 1.91 |
| | Vineyard 2 | |
| Net photosynthesis $\mu mol\ CO_2\ m^{-2}\ s^{-1}$ | 7.21 | 7.61 |
| Transpiration mmol $H_2O\ m^{-2}\ s^{-1}$ | 5.78 | 5.51 |
| Stomatal conductance mmol $H_2O\ m^{-2}\ s^{-1}$ | 784 | 218 |
| Efficiency of water use (WUE) | 1.39 | 1.73 |

Results of the Growing Season 2021

Epidemiological Findings on the Vineyards

Compared to the previous season, the year 2021 showed a modest impact of the disease in Vineyard 2, probably following a seasonal trend not particularly favourable to pathological manifestations. Vineyard 1, on the other hand, maintained a similar incidence in the two vintages (Table 7).

Overall, in this year we have seen a lower mortality in both vineyards, especially of the plants treated in Vineyard 1, passing from 8 (2020) to 2 (2021) dead plants.

TABLE 7

| Phytosanitary monitoring of vineyards in the 2021 season. | | |
|---|---|---|
| State of the grapevines | Vineyard 1 | Vineyard 2 |
| Plants with symptoms 2021 untreated | 75 | 35 |
| Plants with symptoms 2021 treated (B + I) | 14 | 6 |
| Plants treated in 2020 (I) | 75 | 200 |
| Dead plants in 2021 which did not survive this year's treatment | 1 | 1 |
| Dead plants in 2021 treated in the previous 2 years (B) | 1 | 1 |
| Dead plants without treatment | 7 | 4 |
| Total vines examined and mapped | 2,314 | 3,066 |

Physiological Findings

Two days of measurements were carried out for each vineyard: on 8 July and 3 August for Vineyard 2 and on 9 July and 3 August for the Vineyard 1, always carried out between 10 am and 1 pm.

The fluorimetric parameters detected for each group are shown in Tables 8 and 9.

From the analysis of the variance between the groups and subsequent post-hoc processing of the averages, it appears that the parameters $F_0$ and $F_M/F_0$ were significant in Vineyard 1. In Vineyard 2 only the $F_M$ parameter shows significance among the groups with $P<0.05$.

TABLE 8

Fluorometer parameters measured in Vineyard 2. The level of statistical significance
is indicated for each parameter (* = P < 0.05; ns = not significant);
different letters indicate significant differences between the groups.

| Parameter | A | B | I | M | S | significance |
|---|---|---|---|---|---|---|
| $F_0$ | 502.3 | 514.3 | 516.7 | 507.6 | 503.0 | ns |
| $F_M$ | 2,731 ab | 2,949 a | 2,849 a | 2,473 b | 2686 ab | * |
| $F_M/F_0$ | 5.4 | 5.7 | 5.5 | 5.1 | 5.3 | ns |
| $F_V/F_M$ | 0.82 | 0.83 | 0.82 | 0.80 | 0.81 | ns |
| $PI_{tot}$ | 7.7 | 7.1 | 6.9 | 6.7 | 7.2 | ns |

Legenda:

A: Grapevines treated with vertical cut only in 2020;

B: Grapevines treated with Zeofix in previous years (2018-2019)

I: Grapevines treated with cut + Zeofix in 2020;

M: Symptomatic Diseased Control Grapevines 2020;

S: 2020 control healthy Grapevines

TABLE 9

Fluorometer parameters detected in Vineyard 1. The level of statistical significance
is indicated for each parameter (* = P < 0.05; ns = not significant);
different letters indicate significant differences between the groups.

| Parameter | A | B | I | M | S | significance |
|---|---|---|---|---|---|---|
| $F_0$ | 505.6 ab | 501.3 b | 499.7 b | 536.8 a | 507.1 ab | * |
| $F_M$ | 2572 | 2588 | 2717 | 2513 | 2555 | ns |
| $F_M/F_0$ | 5.1 ab | 5.2 ab | 5.4 a | 4.7 b | 5.0 ab | * |
| $F_V/F_M$ | 0.80 | 0.81 | 0.82 | 0.79 | 0.80 | ns |
| $PI_{tot}$ | 5 | 6.6 | 6.0 | 5.0 | 5.7 | ns |

Legenda:
A: Grapevines treated with vertical cut only in 2020;
B: Grapevines treated with Zeofix in previous years (2018-2019)
I: Grapevines treated with cut + Zeofix in 2020;
M: Symptomatic Diseased Control Grapevines 2020;
S: 2020 control healthy Grapevines From the overall data it emerges that untreated diseased plants (Group M) are different from healthy plants (S) and from the groups of treated ones (A, B, I). On the other hand, there are no significant differences within the group of treated plants, just as there are no marked differences between the group of treated plants and healthy (asymptomatic) ones, indicating a substantial equivalence of photosynthetic activity.

Monitoring with Thermal Imaging Camera

Table 10 shows the average values of the parameters measured for each group, considering the two measurement dates in each vineyard. ΔT indicates the temperature difference between the air and the leaf surface. The higher the difference between the temperature of the air and that of the leaves, the greater the water stress of the vine. CWSI (Crop Water Stress Index) indicates the water stress index, which is related to water potential, stomatal conductance or moisture present in the soil, thus making it a parameter useful for evaluating the water status of plants. The parameter takes on values between 0 and 1, with 1 maximum stress index.

TABLE 10

Parameters detected by the thermal imaging camera in both vineyards.
The level of statistical significance is indicated for each
parameter (* = P < 0.05; ** = P < 0.01;
ns = not significant). Where significant, the results were
then subjected to post-hoc test (Tukey test); different letters
indicate significant differences between the groups.

| Parameter | A | B | I | M | S | significance |
|---|---|---|---|---|---|---|
| | Vineyard 2 | | | | | |
| ΔT | 1.27 ab | 1.33 ab | 1.14 ab | 0.8 b | 1.93 a | ** |
| CWSI | 0.48 ab | 0.49 ab | 0.46 ab | 0.37 b | 0.52 a | * |
| | Vineyard 1 | | | | | |
| ΔT | 1.77 | 3.91 | 3.92 | 3.25 | 4.59 | nr |
| CWSI | 0.32 | 0.53 | 0.52 | 0.45 | 0.59 | nr |

Legenda:
A: Grapevines treated with vertical cut only in 2020;
B: Grapevines treated with Zeofix in previous years (2018-2019)
I: Grapevines treated with cut + Zeofix in 2020;
M: Symptomatic Diseased Control Grapevines 2020;
S: 2020 control healthy Grapevines From the analysis of the variances between all the groups and subsequent post-hoc processing, Vineyard 2 highlights significant differences for the parameters $\Delta T$ ($T_{plant}-T_{environment}$) and CWSI with a level of p<0.01 for the first parameter and p<0.05 for the second.

In Vineyard 1, no parameter detected by the thermal imaging camera was significant.

From the overall data in Vineyard 2, it emerges instead that untreated diseased plants (Group M) are distinguished from healthy (asymptomatic) plants (S), while the group of treated plants is in an intermediate level.

These differences show a higher temperature in healthy plants (S), an index of lower leaf transpiration than in diseased plants (M), as confirmed by the transpiration parameter relating to gas exchanges. The lower surface temperature of the leaves of diseased plants is probably due to a consumption of water related to a reduced vegetative activity (as noted by the WUE and to the smaller surfaces of the foliage. As already pointed out, the plants of the treated groups have intermediate values between the healthy and the diseased groups. This data must be related to the development of the canopy. A reduced canopy can promote greater air circulation, vice versa, under the same conditions, there will be reduced shading. Both of these factors can affect the leaf temperature measurement carried out with a thermal imaging camera.

Measurement of Leaf Gaseous Exchanges

The measurements relating to leaf gaseous exchanges were carried out in two sessions for each vineyard, one in July 2021 (on day 8 at Vineyard 2, on day 9 at Vineyard 1) and one in August (on day 3, for both vineyards).

The measurements were carried out on replicas of three grapevines for each of the five identified experimental groups, as well as for all the other instrumental measurements carried out. In particular, three leaves per vine (each on a different sprout) were carefully chosen, having similar characteristics in terms of age and exposure.

The data obtained were statistically analysed through analysis of variance (ANOVA), grouping the two measurement dates in each vineyard. Tables 11 and 12 show the average values of the parameters measured for each group, respectively in the two Vineyards. The level of statistical significance and any difference between the groups is indicated for each parameter.

TABLE 11

Measured parameters relating to gas exchanges in Vineyard 2. The level of statistical significance is indicated for each parameter (*** = P < 0.001); different letters indicate significant differences between the groups.

| Parameter | A | B | I | M | S | significance |
|---|---|---|---|---|---|---|
| Net photosynthesis $\mu$mol $CO_2$ m$^{-2}$ s$^{-1}$ | 7.44 | 7.43 | 7.86 | 5.96 | 5.82 | nr |
| Transpiration mmol $H_2O$ m$^{-2}$ s$^{-1}$ | 6.35 ab | 4.62 c | 7.53 a | 5.67 bc | 2.96 d | *** |
| Stomatal conductance mmol $H_2O$ m$^{-2}$ s$^{-1}$ | 214 ab | 154 bc | 247 a | 175 ab | 95 c | *** |
| Water use efficiency (WUE) | 1.17 bc | 1.97 ab | 1.01 c | 1.10 bc | 2.58 a | *** |

Legenda:
A: Grapevines treated with vertical cut only in 2020;
B: Grapevines treated with Zeofix in previous years (2018-2019)
I: Grapevines treated with cut + Zeofix in 2020;
M: Symptomatic Diseased Control Grapevines 2020;
S: 2020 control healthy Grapevines

TABLE 12

Measured parameters relating to gas exchanges (CIRAS) in Vineyard 1. The level of statistical significance is indicated for each parameter ( = P < 0.01; * = P < 0.001); different letters indicate significant differences between the groups.

| Parameter | A | B | I | M | S | significance |
|---|---|---|---|---|---|---|
| Net photosynthesis $\mu$mol $CO_2$ m$^{-2}$ s$^{-1}$ | 9.96 a | 7.40 ab | 8.18 ab | 10.56 a | 6.04 b | ** |
| Transpiration mmol $H_2O$ m$^{-2}$ s$^{-1}$ | 5.01 ab | 4.52 bc | 3.44 c | 5.98 a | 4.27 bc | *** |
| Stomatal conductance mmol $H_2O$ m$^{-2}$ s$^{-1}$ | 225 a | 163 ab | 131 b | 228 a | 119 b | ** |
| Water use efficiency (WUE) | 2.06 ab | 1.69 b | 2.44 a | 1.93 ab | 1.40 b | ** |

Legenda:
A: Grapevines treated with vertical cut only in 2020;
B: Grapevines treated with Zeofix in previous years (2018-2019)
I: Grapevines treated with cut + Zeofix in 2020;
M: Symptomatic Diseased Control Grapevines 2020;
S: 2020 control healthy Grapevines According to the analysis of the results obtained following the measurements of leaf gas exchanges on the five experimental groups considered, it is highlighted that there were significant differences in most of the parameters measured in both vineyards. The physiological behaviour of the grapevines, however, was different between the groups in the two areas. As already highlighted for other surveys carried out (thermal imaging camera and fluorometer) this is probably due to the different environmental conditions that the vineyards had, also following the late frost suffered by the plants in April and the different response to the prolonged drought period characterizing the 2021 season.

In Vineyard 2 no differences in photosynthesis were found between the groups. In healthy (asymptomatic) vines (S), transpiration and stomatal conductance were lower, and in general, these plants had better water use efficiency, adequately exploiting the water present for photosynthesis and carbon organization. Group A (cutting only) and I (Zeofix treatment in 2020) had a behaviour more similar to diseased plants (M), while vines B (Zeofix treatment in 2018 and 2019) intermediate values, closer to those of healthy plants. In Vineyard 1 the highest photosynthesis was recorded in the diseased vines and in the vines belonging to Group A. For diseased grapevines, this could be due to a greater activity of the few leaves present. The minimum values were detected in healthy plants and intermediate values in the two groups B and I treated with Zeofix. Also for the parameters of transpiration and stomatal conductance both groups treated with Zeofix showed a behaviour more similar to healthy screws, while group A showed a greater similarity with diseased grapevines.

CONCLUSIONS

The experimentation made it possible to monitor the trend of esca disease in two years and in different environmental conditions. It was also possible to carry out the first evaluations on the effectiveness of the Zeofix product applied to symptomatic plants.

The 2021 year compared to the previous season showed a lower overall impact of the disease in Vineyard 2, going from 8.5% (7.2% untreated plants plus 1.3% treated) in 2020 to 1.3% (1.1% untreated plants plus 0.2% treated.

Vineyard 1, on the other hand, showed less marked differences between the two years maintained, recording an incidence of 5.3% (3.7% untreated plants plus 1.6% treated) in 2020 and 3.8% (3.1% untreated plants plus 0.7% treated) in 2021.

Analyzing the treated plants that still showed symptoms of the esca disease, we note that in 2020 in Vineyard 2 there were 18.3% (20.4% also counting dead plants), while in 2021 these were only 1.5% (2% including dead plants). The same trend was observed in Vineyard 1, where, despite the treatment, symptomatic plants in 2020 were 11.7% (15.8% including dead plants) while in 2021 they were 4.4% (5% also considering dead plants). Compared to the previous year, we can see a lower mortality in both vineyards, above all there is a lower mortality of the plants treated in Vineyard 1, passing from 8 to 2 dead plants from 2020 to the following year.

In general, on the basis of these first results, the grapevines treated with Zeofix and dendrosurgery interventions showed a good vegetative recovery and a lower number of dead plants compared to the untreated plants.

Example 3—Application of the Composition of the Invention on Organic Pellets for the Prevention of the Expansion of the Esca Disease to Healthy Plants Organic pellets, on which the composition of the invention prepared in Example 1 (called Zeofix) had been inoculated, were applied to the soil, in which healthy plants grew. From the second year of application to the soil, the expansion of the esca disease to these healthy plants had been reduced to 1.5%.

Comparative Example 1—Treatment of Esca Disease with the Composition of the Invention with Pollarding In this experiment, the dendrosurgery operation on diseased plants was performed differently: instead of performing the longitudinal cut on an extended surface of the stem, the grapevine was pollarded and a split was made on the remaining portion of the stem where the composition of the invention prepared in Example 1 (called Zeofix) was applied. This type of treatment, however, did not lead to the same results shown in Example 2, probably due to the reduced contact surface and the reduced quantity applicable, and after a few months, the symptom reappeared massively with about 50-60% of relapses on the treated plants.

Comparative Example 2—Treatment of Esca Disease with Single Components of the Composition of the Invention without Dendrosurgery In this experiment a number of diseased plants were treated by spraying individual components of the composition of the invention, in particular they were treated with Biowave 1000™ and Challenger Evo Q™ applied separately. Following this treatment, only the delay of a few weeks of the stroke of the grapevine caused by the esca disease was obtained.

Comparative Example 3—Application of Individual Components of the Composition of the Invention on Organic Pellets for the Prevention of the Expansion of the Esca Disease to Healthy Plants Organic pellets were applied to the soil, in which healthy plants grew, in which only the Biowave 1000™ components and with Challenger Evo Q™ of the composition of the invention had been inoculated. In this terrain, the expansion of the esca disease on healthy plants has never slowed down and has always remained around 3% annual increase.

Comparative Example 4—Treatment of Esca Disease with Single Components of the Composition of the Invention with Longitudinal Cut In this experimentation a number of diseased plants were treated by longitudinally cutting the stem of diseased plants and spraying individual components of the composition of the invention, in particular they were treated with Biowave 1000™ and Challenger Evo Q™ applied separately.

Following this treatment, the plants that presented with full-blown symptoms of the esca disease re-presented the same symptoms at the vegetative restart in the order of 80-85%.

The invention claimed is:

1. A composition for the treatment and prevention of esca disease comprising:
   1) a mixture of minerals comprising clinoptilolite, zeolitite, and fullerite;
   2) a microbial mixture comprising *Trichoderma* atroviride, *Pseudomonas fluorescens, Bacillus subtilis*, and *Streptomyces griseus;*
   3) polyglutamic acid;
   4) *Ascophyllum nodosum* algae;
   5) an organic fertilizer of vegetable origin containing free amino acids;
   6) molasses pre-fermented with the microbial mixture of component 2, wherein said molasses comprises polyglutamic acid and polyhydroxybutyrate, and
   7) additional fullerite in the form of an aqueous suspension.

2. The composition according to claim 1, wherein the weight of the mineral mixture is 30% to 75% relative to the total weight of the composition of claim 1.

3. The composition according to claim 1, wherein the weight of the microbial mixture is 3% to 7% relative to the total weight of the composition of claim 1.

4. The composition according to claim 1, wherein the weight of polyglutamic acid is 6% to 10% relative to the total weight of the composition of claim 1.

5. The composition according to claim 1, wherein the weight of *Ascophyllum nodosum* algae is 1% to 5% weight relative to the total weight of the composition of claim 1.

6. The composition according to claim 1, wherein the weight of organic fertilizer containing free amino acids is 40% to 50% relative to the total weight of the composition of claim 1.

7. The composition according to claim 1, wherein the weight of molasses is 1% to 5% relative to the total weight of the composition of claim 1.

8. The composition according to claim 1, wherein the weight of the aqueous suspension of fullerite is 3% to 6% relative to the total weight of the composition of claim 1.

9. The composition according to claim 1, in the form of a liquid or a paste.

10. A method for treating esca disease in a grapevine comprising:
    1) Making a longitudinal cut of a stem of the grapevine to obtain two sections; and
    2) Applying the composition of claim 1 uniformly on each surface of the two sections of the stem.

11. A method for preventing esca disease in grapevines, comprising dispersing the composition of claim 1 on aerial parts of the grapevines and/or on the ground surrounding the grapevine plant.

* * * * *